United States Patent [19]

Sclufer

[11] 4,252,606
[45] Feb. 24, 1981

[54] METHOD AND APPARATUS FOR CONFINING A PLASMA

[76] Inventor: Nicholas Sclufer, 725 Dodds La., Gladwyne, Pa. 19035

[21] Appl. No.: 913,126

[22] Filed: Jun. 6, 1978

[51] Int. Cl.³ .............................................. G21B 1/00
[52] U.S. Cl. ........................................ 176/1; 176/3; 176/7
[58] Field of Search ................................ 176/1, 3, 7; 331/DIG. 1; 350/319

[56] References Cited

U.S. PATENT DOCUMENTS

| | | | |
|---|---|---|---|
| 3,157,726 | 11/1964 | Hicks, Jr. et al. | 350/319 |
| 3,586,816 | 6/1971 | Hager | 331/DIG. 1 |
| 3,607,627 | 9/1971 | Furth et al. | 176/3 |
| 3,652,393 | 3/1972 | Kaiser et al. | 176/1 |
| 3,755,073 | 8/1973 | Haught et al. | 176/1 |
| 4,084,887 | 4/1978 | Sigler | 176/1 |
| 4,166,761 | 9/1979 | Aloupis | 176/7 |

FOREIGN PATENT DOCUMENTS

| | | | |
|---|---|---|---|
| 1153599 | 5/1969 | United Kingdom | 176/1 |
| 1482526 | 8/1977 | United Kingdom | 176/1 |

*Primary Examiner*—Harvey E. Behrend
*Attorney, Agent, or Firm*—Albert L. Free

OTHER PUBLICATIONS

Laser Focus, Vol. 11 No. 6, pp. 49–51.

[57] ABSTRACT

A high-temperature plasma is surrounded with a laser-beam wall to aid in its confinement. When such a laser-beam wall is used in combination with a confining magnetic field acting on a plasma of nuclear fuel material, the confinement time of the plasma is increased sufficiently to produce useful energy and to act as an efficient neutron source.

1 Claim, 7 Drawing Figures

METHOD AND APPARATUS FOR CONFINING A PLASMA

BACKGROUND OF THE INVENTION

Plasmas, and method for producing them and using them, have been known for some time. In many applications of plasmas, it is desirable to confine the very high-temperature plasma to as small a volume as possible for as long as possible by means other than mechanical walls, despite its strong tendency to expand and to cool, due to a number of known cooling effects. If a plasma is produced within an ordinary container, without special provisions for confinement, its temperature will rapidly decrease because of plasma expansion, nuclear reradiation, plasma instabilities, bremmsstrahlung radiation from heavy-element contaminants, and the transfer of energy from the nuclei to the walls of the container by collisions. If, instead, a high-temperature plasma of a given density can be appropriately confined for a sufficient time, without contacting heat-absorbing walls, nuclear fusion and production of neutrons will be enhanced. The desired confinement time for a given type of plasma at a given temperature t is inversely related to the number n of electrons per unit volume (the "particle density"), and hence it is the product nt which one wishes to maximize.

It is known that strong magnetic fields, applied in any of a number of different geometries, have a tendency to confine the hot plasma. However, although the thermal pressure of the plasma (for example, for a 10 Kev plasma of a mixture of deuterium and tritium of suitable density) is not greater than the effective pressure exerted on the plasma by presently attainable magnetic fields, the lack of a stable equilibrium causes rapid plasma losses. So far as is known, the best laboratory results using such magnetic fields alone have been to confine plasmas with particle densities of $10^{13}$ to $10^{14}$ per cubic centimeter for times of $10^{-2}$ to $10^{-1}$ second or with densities of from $10^{15}$ to $10^{16}$ per c.c. for times of the order $10^{-6}$ second, or with densities of the order of $10^{21}$ per c.c. for times of the order of $10^{-9}$ second, giving values of nt orders of magntidue lower than would be desirable in many applications.

The important conditions to be met for the attainment of intense neutron generation, and useful nuclear fusion energy production, are then (1) production of a high-temperature plasma of a suitable material; (2) confinement of the plasma to a volume sufficiently small to minimize energy losses to the chamber wall; (3) supplying sufficient energy after initiation of the reaction to overcome energy losses due to re-radiation, instabilities and bremsstrahlung radiation from contaminants; and (4) maintaining the high temperature and confinement for a sufficient length of time.

Neutron radiations have been found especially useful for their sterilizing effect in killing harmful bacteria and other microorganisms, and have substantial utility for such purposes. Nuclear fusion is of course useful in nuclear experimentation and in the production of usable energy. References relating to use of neutrons in food sterilization include: paper entitled "Ionizing Radiation in Processing Meat and Dairy Products", by C. F. Niven, Jr., presented at a meeting held at Michigan State University, East Lansing, Michigan, Jan. 12–14, 1956, the full proceedings of which meeting are reported in A.E.C. Report No. TIC-7512; and book entitled "Applications of Ionizing Radiations" by Bernard Proctor, published 1952 by Cambridge Press, especially pages 4, 94, 95, 117, 168, 169, 198, 199, 200–203. Typical known types of neutron-producing devices include plasma focus devices such as are referred to in a paper of G. Decker et al entitled "Focus Devices With Respect to Density And Current Distribution, and Neutron and X-ray Emission" published in "Plasma Physics and Controlled Nuclear Fusion Research 1976, Vol. III, 6th Conference Proceedings, Berchtesgaden, 6–13 October 1976" by International Atomic Energy Agency, Vienna 1977, p. 441 ff., and other papers of that Conference.

One approach which has been attempted in an effort to obtain useful nuclear fusion reactions is disclosed in U.S. Pat. No. 3,489,645 of J. W. Daiber et al, issued Jan. 13, 1970. According to the method proposed therein, no magnetic field is utilized to increase the confinement time, and instead that patent proposes to produce such high temperatures and pressures in the plasma that the containment time becomes extremely short, for example on the order of $10^{-8}$ second. This is to be accomplished by first energizing a central region of a body of fusion material by applying a low-energy laser beam thereto to produce an "exploding" wave, and shortly thereafter impinging the periphery of the fuel with lasers of much higher energy, thereby to produce an "imploding" wave. It is asserted in the patent that very high plasma densities and very high temperatures are thereby produced, such that in about $10^{-8}$ second a useful fusion reaction occurs. So far as is known, the proposed method has not been scientifically or commercially successful, and it is apparent that in any event it requires extremely-precise aiming and timing of laser beams, as well as adjustment of their energy levels, in order to satisfy the conditions described in the patent.

U.S. Pat. No. 3,652,393 of Wolfgang Kaiser et al, issued Mar. 28, 1972 proposes to produce useful nuclear fusion by impingement of two opposed laser beams upon the inner opposed surfaces of a pair of semi-spherical fuel targets. The intention apparently is for the fuel material thereby spalled off of the interior opposed surfaces of the two targets to implode toward the center of the target segments, producing the desired plasma. So far as is known, this proposed method has not been scientifically or commercially successful.

SUMMARY OF THE INVENTION

In accordance with the present invention, a method and apparatus for confining a high-temperature plasma is provided which comprises forming a laser-beam wall around said plasma while also applying a confining magnetic field to the plasma. Preferably one or more concentric shells or tubes of laser-beam light are produced, and the plasma is formed within the region surrounded by the inner tube or shell. The formation of the plasma from the fuel material may be accomplished by impinging it with a high-energy laser beam while the fuel material is contained within the region surrounded by the inner laser shell, or by other known techniques such as radio-frequency plasma production, ohmic-heating discharge, or plasma injection. A confining magnetic field is also applied to the plasma in known manner to augment the confining effect of the wall or walls of laser-beam light. The laser beam wall may be in the form of a divergent cone, a convergent cone, a right-cylindrical tube, or of any other form enclosing the plasma and separating the plasma from the adjacent walls of the chamber.

While the foregoing conventional methods of plasma generation may be used, it is preferred to use the following method. Discrete bodies, such as drops, of a suitable plasma-forming fuel material are injected into a suitable chamber, such as a chamber filled in conventional manner with a suitable fuel gas at a suitable pressure, and magnetic means are positioned adjacent the outer walls of the chamber to produce a plasma-confining magnetic field within the chamber; a laser-beam impinges each of the bodies or drops of fuel as it moves through said chamber to form a plasma thereof, and at least one laser-beam wall is provided around the plasma to exert an additional confining effect on the plasma. Suitable materials are placed adjacent the exterior of the chamber to absorb the radiation, principally neutrons, emitted from the plasma. The material absorbing such radiations is thereby subjected to a sterilizing effect, as desired in certain applications; or, the resultant rise in temperature of the absorbing material can be utilized in any of a variety of known ways as a source of useful energy.

The effect of the laser beam walls, shells, or tubes utilized for plasma-confining purposes is as follows in a preferred embodiment. As the plasma produced from the body of fuel expands and plasma transport takes place, the tubular laser beam is synchronously triggered at a suitable time and ionizes the background fuel gas in the chamber. The plasma thus produced is hot in the beam region and gradually cools down away from the beam region. As a result of thermal pressure balance, the plasma density in the colder region is invariably higher than that in the hotter region; thus on the outer edge of the beam a density gradient in the opposite direction to that of the outward expanding plasma first produced is created. Such density reversal will retard the outward diffusion rate of the initial plasma, as illustrated in the numerical calculations set forth below. Where more than one wall is used, this effect is repeated by the additional outer laser-beam walls or shells as to that plasma which leaks through the first wall.

In the absence of laser-beam walls, the diffusion velocity $V_D$ of a plasma across the magnetic field, due to collisions of unlike particles, is given by $$V_D = -\frac{1.78 \times 10^{-3} \ln \Lambda}{B^2 T^{\frac{1}{2}}} \vec{\nabla} n \qquad (2)$$

where $\ln \Lambda$ is a constant of the order 10 for reactor-regime plasmas, B is the strength of the magnetic field in Gauss, T is the electron temperature in degree Kelvin, and $\vec{\nabla} n$ is the density gradient in 1/cm$^3$-cm.

The outward distance $L_o$ over which the plasma diffuses in a time $t_c$ is therefore $$L_o = \frac{1.78 \times 10^{-3} n_{po} t_c \ln \Lambda}{B^2 T^{\frac{1}{2}}} \qquad (3)$$

where $n_{pq}$ is the plasma peak density in cm$^{-3}$ and where we have used, without loss of generality, $\vec{\nabla} n_{po}/n_{po} \simeq 1$ cm$^{-1}$. In the presence of a second, reverse density gradient with peak density $n_{p1}$, the effective diffusion distance over which the plasma diffuses in time $t_c$ is approximately reduced to $$\Delta L = L_o - L_1 = \frac{1.78 \times 10^{-3} t_c \ln \Lambda}{B^2 T^{\frac{1}{2}}} (n_{po} - n_{p1}) \qquad (4)$$

where we have used, again without loss of generality, $\vec{\nabla} n_{p1}/n_{p1} = 1$ cm$^{-1}$. The diffusion distance in a time $t_c$ has been effectively reduced by a factor $(n_{po} - n_{p1})/n_{po}$. The desired diffusion distance for achieving effective fusion can be achieved by introducing successive reverse density gradients, if necessary. For example, for nt = 10$^{14}$ sec/cm$^3$, B=50 kG, T=5, keV $n_{p1} t_c = 0.95\ n_{po} t_c$, the diffusion distance is reduced by a factor of 20, i.e. about 0.2 cm to 0.01 cm. This means that for the same size of nuclear reactor, the confinement time is increased by a factor of 20.

The concept represented in the present disclosure is equally applicable to diffusion losses other than those due to binary collisions. A formula that has often been found to agree with laboratory observations in the Bohm diffusion equation. The reduced diffusion distance due to a second, reverse density gradient $\vec{\nabla} n_{p1}/n_{p1}$ in this case then is given by $$\Delta L = L_o - L_1 = \frac{5.4 \times 10^2 T t_c}{B} \left( \frac{\vec{\nabla} n_{po}}{n_{po}} - \frac{\vec{\nabla} n_{p1}}{n_{p1}} \right) \qquad (5)$$

For example, if we use as a criterion nt = 10$^{14}$ sec/cm$^3$ at T = 10 keV, $|\vec{\nabla} n_{po}/n_{po}| \simeq$ cm$^{-1}$, B = 125 kG, $t_c$ = 0.2 sec, without reverse density gradient, $L_o \simeq$ 1 kilometer. This length represents a plasma dimension too huge to be either practical or economical. This distance, however, can be reduced by introducing one, or several, reverse density gradients. For $\vec{\nabla} n_{p1}/n_{p1} = 0.95$, the reduced distance is $\Delta L \simeq 50$ meters. The above calculations are examples. The concept presented in the present disclosure for confining the plasma or improving the plasma confinement is applicable to any parameter regime in which, without reverse density gradients, plasma loss is undesirably severe.

In the proposed device, it is possible to select a range of plasma number density n between 10$^{16}$ and 10$^{19}$ and a range of temperature T between 1 Kev and 10 Kev. Any combination of n and T will determine the magnetic field required to balance the plasma pressure, and the intensity of the laser beam required to reach the chosen temperature. Prior to this invention, the best confinement time known even in an experimental device for n = 10$^{18}$ is of the order of 5 × 10$^{-6}$ sec. As shown by the previous calculation, it is possible to increase the confinement time markedly, e.g. by a factor of as much as, 20 by using a tubular laser beam as described herein. Furthermore, the confinement time can be further increased if necessary by introducing successive reverse density gradients by means of additional tubular laser beams.

In addition, the high-frequency waves of the laser beam walls set up ion-acoustic waves which tend to increase effectively the collision frequency of the particles, and in this manner heat lost due to conduction is significantly decreased.

In this manner the confinement time of the plasma is greatly increased, to produce increased neutron generation and/or a nuclear fusion reaction at a rate sufficient to generate useful output energy.

BRIEF DESCRIPTION OF FIGURES

The invention will be more readily understood from a consideration of the following detailed description, taken in connection with the accompanying drawings, in which.

DETAILED DESCRIPTION OF SPECIFIC EMBODIMENTS

Figure 1:
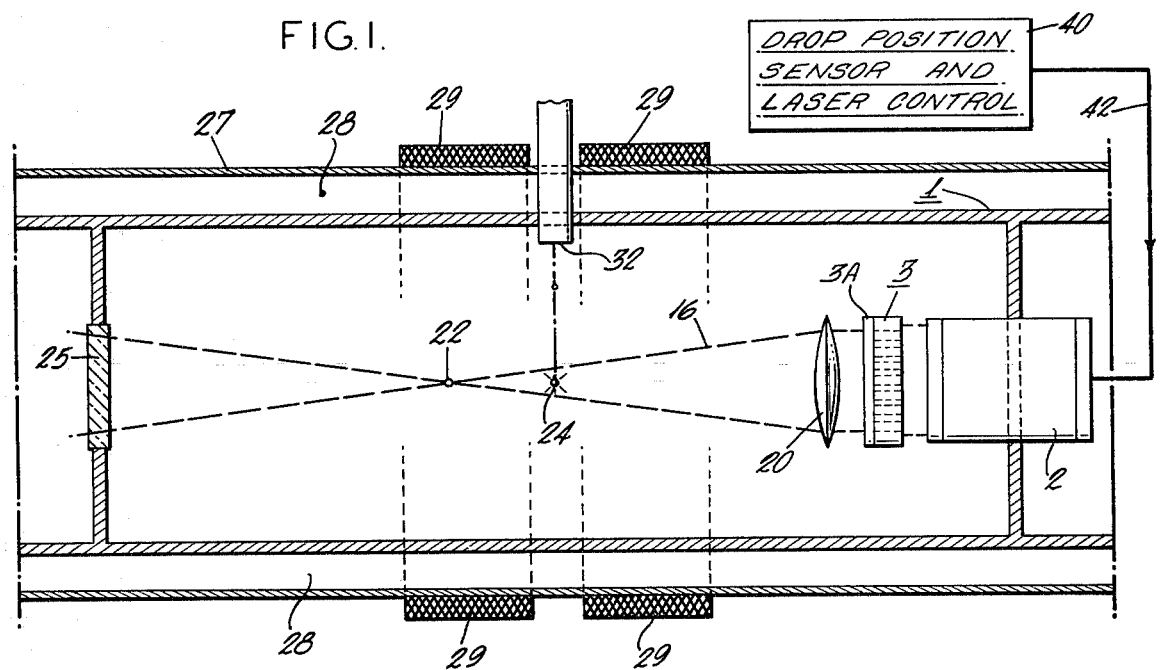
FIG. 1 is a diagrammatic view of one embodiment of the invention.
Figure 2:
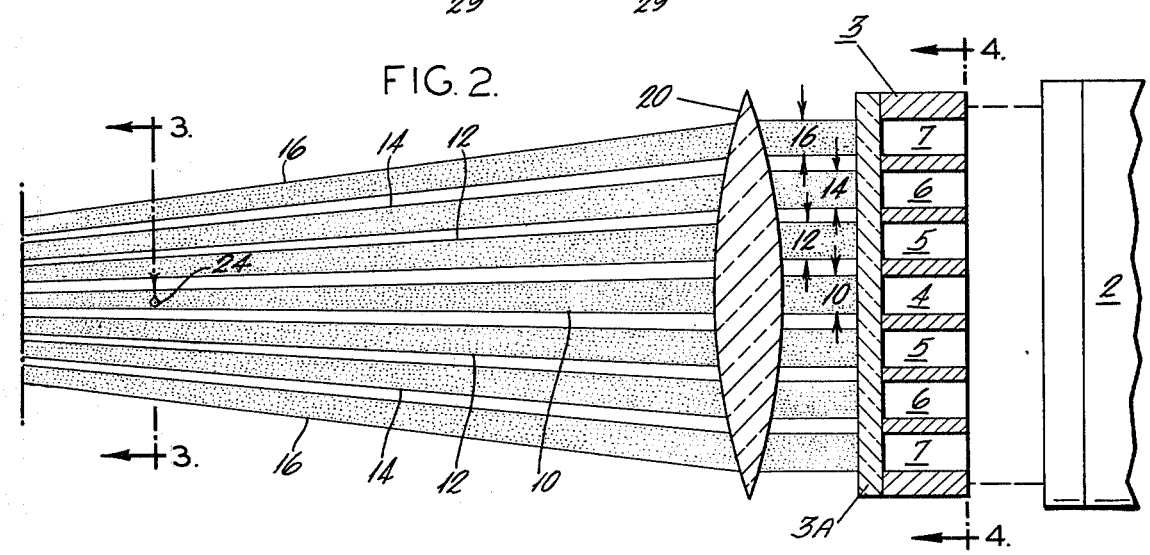
FIG. 2 is an enlarged fragmentary view of a portion of the system shown in FIG. 1.
Figure 3:
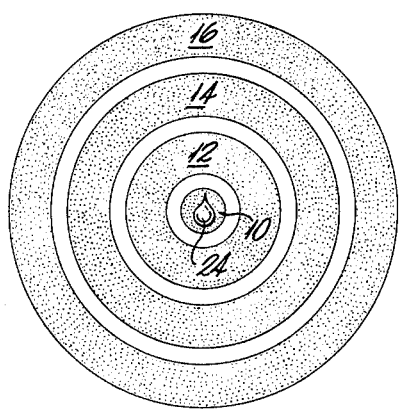
FIG. 3 is a diagrammatic representation corresponding to a sectional view taken along lines 3—3 of FIG. 2.
Figure 4:
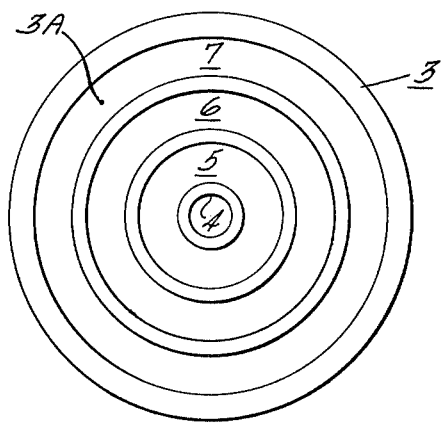
FIG. 4 is a sectional view taken along the lines 4—4 of FIG. 2.

Referring to the embodiment of the invention represented in FIG. 1 by way of example only, shown therein is a cylindrical vacuum chamber 1 of a material which produces negligible magnetic shielding and which is pervious to nuclear fusion neutron radiations. In one wall of the chamber there is mounted a laser source 2, hermetically sealed to the chamber wall. In different applications, the laser may either be a continuous or pulsed carbon dioxide system, a Q-switched or normal mode neodymium glass laser, or any other laser system which provides a coherent light beam of sufficient power at an appropriate wave length. For the present purposes a carbon dioxide laser is preferred. The laser beam irradiates one side of a graphite disc 3 provided with a central bore 4 and three concentric annular apertures 5, 6 and 7. The different portions of the disc may be mounted on the flat glass plate 3A to hold them in position, or the apertures through the disc may be filled with a high-transmissivity glass or plastic for structural rigidity. In another form, the disc may be made of glass or plastic containing a series of grooves which are filled with a laser-light absorbtive material such as pyrolitic graphite. As shown particularly clearly in FIG. 2, the central bore 4 defines an axial laser beam 10, while rings 5, 6 and 7 define three concentric, progressively larger-diameter tubular laser beams 12, 14 and 16. Accordingly, graphite disc 3 serves in fact as a mask for splitting the main laser beam from source 2 into a central beam and three concentric tubes or shells of laser light.

A suitable lens system 20 is placed in the path of light passing through disc 3, to cause the light to converge and focus at a focal point 22 beyond the position at which the fuel drop 24 is to be converted to plasma. After the laser light passes through the focal point 22, it exits through an optical window 25 and may be safely disposed of by allowing it to fall on a graphite slab (not shown).

An outer cylindrical tube 27 of larger diameter than the exterior diameter of the chamber 1 surrounds the latter chamber to provide an annular space through which there flows a neutron-absorbent material such as molten lithium, for example. This material serves as a heat exchange fluid, to be heated by the neutrons from the nuclear fusion process and to deliver the heat thus acquired to a suitable energy utilization device (not shown). The material of the outer cylinder 27 is one that has no substantial magnetic shielding properties, and the coils 29 of a high-power magnet are located thereon as shown and supplied with a high electrical current, so as to produce a plasma-confining magnetic field along the axis of the cylindrical chamber 1 at the position of the fuel drop 24.

Through a gravity or jet feed orifice 32, a discrete body of thermonuclear fuel 24 is introduced into the chamber 1 while the magnetic field is applied but the laser 2 is turned off; the body 24 may be a solid liquid or gas, but is here assumed to be a liquid drop. When the drop 24 reaches a position on the optical axis of the laser 2 as shown in FIG. 1, the laser 2 is fired to surround the drop with the three concentric walls of laser-beam light provided by the light tubes 12, 14 and 16, and the central pencil beam of laser light 10 impinges the drop to convert it to a plasma. Various forms of devices are well known in the art suitable for sensing the arrival of the drop 24 at the position shown on the optical axis of the laser; for example, a photoelectric system acting transversely to the plane of the drawing may be utilized for this purpose. In FIG. 1, such apparatus is represented by the drop-position sensor and laser control 40, which acts over electrical line 42 to control the firing of the laser 2.

When the laser 2 fires, the drop 24 is converted almost instantaneously into a plasma, typically in less than a nanosecond. Under the thermal pressure of the plasma at very high temperatures, the plasma expands and diffusion takes place despite the confining magnetic fields. The tubular laser beam 12 is triggered synchronously with the central pencil beam and deposition of radiant energy in the outer layers of the plasma takes place by several different mechanisms, as follows: (1) the inverse bremsstrahlung effect, or absorption due to electron-ion collisions; this absorption is proportional to the square of the plasma density and the square of the laser wave length, provided the latter is smaller than the wave length associated with the plasma frequency; (2) inverse synchrotron absorption; and (3) anomalous absorption due to heating of successive layers of the plasma through instabilities created by laser light absorption itself.

The combination of these effects causes a reversal in the density gradients in the outer edge of the tubular laser beam, which in turn produces a reverse diffusion of the plasma particles tending to move them back towards the center. To the extent that the plasma leaks through this inner tube or shell or laser light, a similar effect occurs at each of the outer tubes or shells of laser light 14 and 16. The effects of these walls of laser light is therefore to increase the confinement time of the plasma, and to maintain and to increase the very high temperature of the plasma.

One preferred method for the utilization of energy from the apparatus shown is by moving a material to be subjected to the energy through the annular space 28 in a concentric tube surrounding the central chamber. Neutrons emitted during the process will exert a sterilizing effect on the material in the tube, where sterilization is the objective, and where heating by nuclear fusion is the objective, a liquid metal such as lithium may be passed through the tube, heated by the neutron radiation, and then moved to another position to deliver energy by any of a variety of known methods.

It is noted that, except for the use of laser-beam walls surrounding the plasma, the construction and operation of the elements of the system may be as in the prior art. Accordingly, the invention is not limited to the use of any particular form or material for the fuel or for the apparatus, or to any particular manner of producing the plasma, although the use of the central laser beam for the latter purpose is especially convenient in the present case. Furthermore, techniques suitable for forming the surrounding laser-beam walls, such as the techniques specifically exemplified in the drawings, are also well within the skill of the art in view of the disclosure herein.

Figure 5:
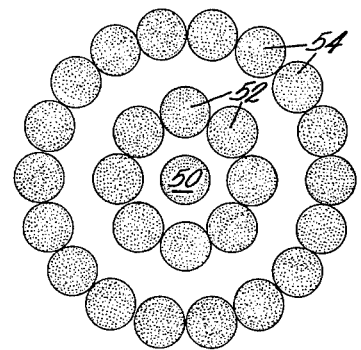
FIGS. 5, 6 and 7 are diagrammatic views illustrating various alternative geometric arrangements of laser beams which may be utilized in practicing the invention.

FIG. 5 illustrates an alternative way of producing the plasma-surrounding, laser-beam walls. This drawing represents, schematically, a cross-section of the laser light in the vicinity of the drop 24. In this case one laser produces the central laser beam 50 used to create the plasma, another set of individual lasers such as 52 are arranged around a circle with their beam edges contiguous to each other so as to form an essentially continuous inner wall around the plasma, and another set of individual laser beams such as 54 are placed around a larger diameter circle so as to form an essentially continuous outer wall of laser-beam light.

Figure 6:
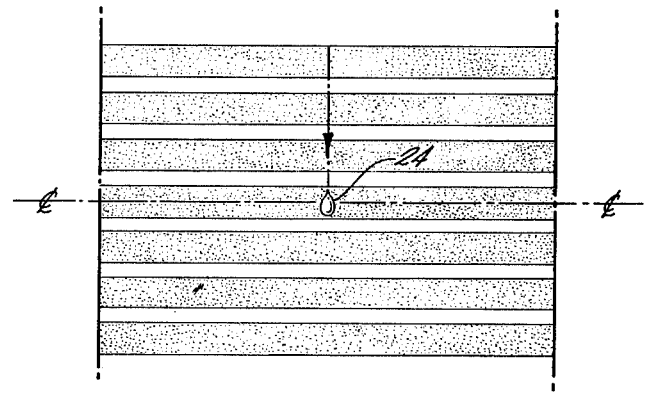
Figure 7:
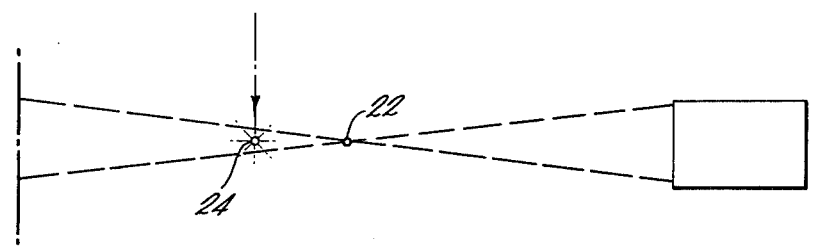

FIG. 6 is a schematic drawing illustrating that the laser beam walls may be essentially right-cylindrical, i.e. produced by parallel rays of laser lights, rather than converging beams; FIG. 7 illustrates schematically that the laser beam may be diverging, rather than converging, as they pass the plasma drop, an effect which is readily provided by locating the drop beyond the focal point 22 as shown in FIG. 7. It will be understood that the exact values of the parameters optimum for a given application will depend upon details of the structures and materials employed, and that if a given set of values of these parameters does not produce a sufficient plasma confining effect, than one or more of these parameters should be adjusted in the direction to enhance this rate, for example by using a longer or narrower chamber, a higher light intensity, a greater magnetic field, or a greater initial plasma number density.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. In a method for producing nuclear fusion of a desired degree by creating a high-temperature plasma and confining it for a time sufficient to accomplish said desired degree of nuclear fusion:

providing a linear fusion chamber having physical side walls;

creating a high-temperature plasma at a structure-free location in said chamber and between said sidewalls by impinging a body of nuclear fusion fuel with a pulse of laser light of pencil-beam form, whereby said plasma tends to expand rapidly toward said sidewalls without physical impediment;

from the time of inception of said pulse of laser light, applying a plasma-confining magnetic field to said plasma by way of said sidewalls, thereby to exert a magnetic confining effect on said plasma and slowing its expansion toward said walls, said magnetic confining effect in itself being insufficient to produce said degree of nuclear fusion; and while applying said magnetic field and before said plasma expands to any of said sidewalls, also providing between said plasma and those portions of said walls nearest to said structure-free location, a pulse of confining laser light in the form of at least three concentric successive shells of laser light having their sidewalls spaced from each other by regions substantially free of laser light, the innermost of said shells being spaced from said location by a region substantially free of laser light, the duration and intensity of said pulse of confining laser light being sufficient to produce reverse temperature gradients in said chamber great enough, in combination with said magnetic confining effect, to produce said desired degree of nuclear fusion;

said concentric shells being substantially coaxial with said linear chamber.

* * * * *